March 29, 1966     JOB-WILHELM VON WITZLEBEN     3,242,524
APPARATUS FOR TURNING A FLEXIBLE TUBE INSIDE OUT
Filed May 18, 1964
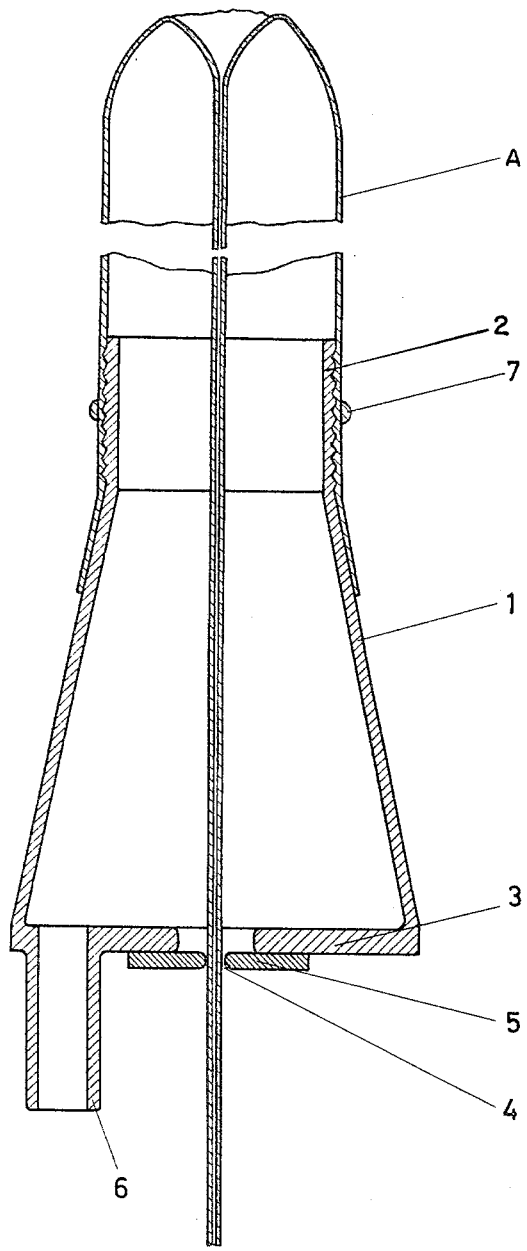
INVENTOR.
Job-Wilhelm von Witzleben
BY Bair, Freeman
& Molinare  ATTORNEYS 3,242,524
APPARATUS FOR TURNING A FLEXIBLE TUBE INSIDE OUT
Job-Wilhelm von Witzleben, Walsrode-Bomlitz, Germany, assignor to Wolff & Co. AG, Walsrode-Bomlitz, Germany, a firm
Filed May 18, 1964, Ser. No. 368,298
Claims priority, application Germany, May 22, 1963, W 34,549
2 Claims. (Cl. 17—43)

This invention relates to improvements in apparatus for turning inside out a flexible tube, particularly, but not exclusively, a sausage casing.

The turning inside out of flexible tubes such as sausage casings has always proved a troublesome procedure and has usually been performed manually. This uneconomic procedure has been an obstacle to the turning inside out of such tubes on a large scale.

It is an object of the present invention to provide an improved apparatus for turning inside out flexible tubes such as sausage casings whereby the result may be achieved quickly, simply and economically.

One embodiment of the invention will now be described by way of example, reference being made to the accompanying drawing which is a longitudinal sectional view of an apparatus acording to the invention.

The apparatus of this example comprises a circular-section hollow member 1 which is substantially funnel shaped being frusto-conical at one end and terminating at the smaller diameter end of the frusto-conical part in a pipe of constant diameter circular cross-section, the free end 2 of which is open to the exterior of the member. The larger diameter end of the frusto-conical part is closed by a cover plate 3 which, as shown, may be integral with the frusto-conical part or may be secured thereto in any known substantially fluid tight manner. The cover plate 5 is formed with a slot or aperture 4 defined by a body of flexible or soft material such as, for example, leather, woven fabric or polytetrafluorethylene (Teflon).

The dimension of the slot or aperture 4 is selected to be such as to permit the passage therethrough of a fluid impermeable flexible tube A, which is to be turned inside out, in a substantially fluid-tight manner, the material engaging the tube A closely in a non-friction and non-scratching manner.

The dimension of the free end 2 of the pipe is preferably slightly smaller than the free end of the tube A and is such that this free end of the tube A when passed through the member 1 may be reversed on itself to engage the open end 2 of the pipe externally in a substantially fluid-tight manner. To facilitate this, the open end 2 of the pipe may be fluted or ribbed externally and a sealing ring 7 is provided to hold the reversed end of the tube A in engagement with the external surface of the pipe in a fluid-tight manner.

There is also provided an inlet pipe 6 opening to the interior of the member and preferably (as shown) through the cover plate 3 for the admission of fluid under pressure to the interior of the member 1.

In the operation of the apparatus described the free end of the tube A is passed through the slot or aperture 4 and through the member 1 until it emerges from the open end 2. This free end is then turned over on itself and pulled over the open end 2 of the pipe to engage the latter externally and the sealing ring is applied to effect a substantially fluid-tight seal. Air, or any other fluid, is now supplied under pressure to the interior of the member through the inlet pipe 6. The tube A is now blown from the interior by the presurized air and is turned inside out. If sufficient space is available, long lengths of 100 yards or more can be turned inside out by the procedure described in a minimum of time. Where the tubes presented to the apparatus are continuous, the tube is blown out as described and is cut off adjacent the aperure 4 when the tube has drawn into itself one half of the length to be treated, i.e. when one half of the tube is turned inside out and the other half lies within the one half that has been turned.

It will be appreciated that in its passage through the slot or aperture 4, the tube A may be flattened and folded upon itself so as to be of substantially circular section.

The method proposed in the invention is simplicity, itself; it depends only on the tube being led through the slot in as air-tight a manner as possible and, after being manually turned over on the opening in the pipe, being attached there in as air-tight a manner as possible. For blowing the tube through, air should preferably be used, but other gases or liquids may also be used.

What is claimed is:

1. Apparatus for turning an elongated flexible tube inside out wherein said tube has a free end and is substantially impermeable to air, said apparatus comprising a hollow member having an open end and a substantially closed end, a flexible member on said closed end and having an aperture therein for permitting the passage of said tube therethrough in a substantially fluid tight condition and to permit said tube to pass into said hollow member and to permit the free end of said tube to be received on said end, a sealing member for maintaining said free end in a substantially fluid tight condition on the open end of said hollow member, and means for introducing fluid under pressure into the interior of said hollow member to effect the desired turning of the elongated flexible tube inside out under the pressure of said fluid.

2. Apparatus for turning an elongated flexible tube inside out wherein said tube has a free end and is substantially impermeable to air, said apparatus comprising a hollow member having an open end and a substantially closed end, the free end of said tube being sealingly received on said open end, said substantially closed end including a closure plate having an aperture therein, à flexible member surrounding said aperture for engaging said tube in a substantially fluid tight manner as said tube is drawn through said aperture, and means for introducing air under pressure to the interior of said hollow member for turning the elongated flexible tube inside out under the action of the pressurized air.

References Cited by the Examiner
UNITED STATES PATENTS
1,038,912   9/1912   Loerke _____ 17—43
1,048,487   12/1912  Billman _____ 17—43

FOREIGN PATENTS
1,187,993   3/1959   France.

SAMUEL KOREN, *Primary Examiner.*
LUCIE H. LAUDENSLAGER, *Examiner.*